US009428102B2

(12) United States Patent
Tajima

(10) Patent No.: US 9,428,102 B2
(45) Date of Patent: Aug. 30, 2016

(54) ACTUATOR

(71) Applicant: KOITO MANUFACTURING CO., LTD., Minato-ku, Tokyo (JP)

(72) Inventor: Keiichi Tajima, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 14/611,656

(22) Filed: Feb. 2, 2015

(65) Prior Publication Data

US 2015/0217676 A1    Aug. 6, 2015

(30) Foreign Application Priority Data

Feb. 3, 2014 (JP) ................. 2014-018654

(51) Int. Cl.
| | |
|---|---|
| *F21V 21/14* | (2006.01) |
| *B60Q 1/076* | (2006.01) |
| *B60Q 1/068* | (2006.01) |
| *F16H 19/08* | (2006.01) |
| *F21S 8/10* | (2006.01) |
| *B60Q 1/115* | (2006.01) |

(52) U.S. Cl.
CPC ............. *B60Q 1/076* (2013.01); *B60Q 1/068* (2013.01); *B60Q 1/0683* (2013.01); *F16H 19/08* (2013.01); *B60Q 1/115* (2013.01); *B60Q 2200/32* (2013.01); *F21S 48/1742* (2013.01); *Y10T 74/18568* (2015.01); *Y10T 74/18792* (2015.01)

(58) Field of Classification Search
CPC ....... F16H 19/04; F16H 19/08; B60Q 1/076; B60Q 1/068; B60Q 1/0683; B60Q 1/245; B60Q 2200/32; B61Q 1/115; F16M 11/14; F21S 48/1742

USPC ........ 362/524, 526, 521, 531, 532, 421, 523
See application file for complete search history.

(56) References Cited

U.S. PATENT DOCUMENTS

| | | | | |
|---|---|---|---|---|
| 7,445,365 | B1 * | 11/2008 | Hsu ........................ | B60Q 1/076 362/286 |
| 2004/0090788 | A1 * | 5/2004 | Ishida .................... | B60Q 1/076 362/467 |
| 2008/0112179 | A1 * | 5/2008 | Tatara .................... | B60Q 1/072 362/515 |
| 2008/0130301 | A1 * | 6/2008 | Kusagaya ............. | B60Q 1/076 362/466 |

FOREIGN PATENT DOCUMENTS

| | | |
|---|---|---|
| JP | 2013-105594 A | 5/2013 |
| JP | 2014-63602 A | 4/2014 |

* cited by examiner

*Primary Examiner* — Y M Lee
(74) *Attorney, Agent, or Firm* — Sughrue Mion, PLLC

(57) ABSTRACT

An actuator is configured to adjust the radiation direction of light emitted from a light source of a lamp unit in a lamp case including a lamp housing having an opening at least at one side and a cover that blocks the opening. The actuator includes: a case body having an internal space serving as an installation space; a drive motor disposed in the installation space; and a driven body having a driving force transmitting portion to which driving force is transmitted from the drive motor, and an output shaft that is coupled to the lamp unit and that outputs the driving force transmitted to the driving force transmitting portion to the lamp unit. The driven body is supported by the case body so as to be movable in the front-rear direction of the lamp unit. The driving force transmitting portion and the output shaft are integral with each other.

4 Claims, 8 Drawing Sheets

ACTUATOR

INCORPORATION BY REFERENCE

The disclosure of Japanese Patent Application No. 2014-18654 filed on Feb. 3, 2014 including the specification, drawings and abstract is incorporated herein by reference in its entirety.

BACKGROUND OF THE INVENTION

1. Field of the Invention

The invention relates to an actuator configured to adjust the optical axis of a lamp unit as an output shaft of the actuator is moved in the front-rear direction by the driving force generated by a drive motor.

2. Description of Related Art

In some vehicular headlamps, a lamp unit including a light source and a reflector that reflects the light emitted from the light source is disposed in a lamp case formed of a cover and a lamp housing.

In some vehicular headlamps, a lamp unit is pivotably (tiltably) supported by a supporting member such as a bracket. The lamp unit is pivoted by the driving force generated by an actuator to adjust the direction of radiation of the light emitted from a light source of the lamp unit (refer to, for example, Japanese Patent Application Publication No. 2013-105594 (JP 2013-105594 A).

In the vehicular headlamp described in JP 2013-105594 A, the lamp unit is pivoted within a vertical plane by the actuator, whereby so-called leveling adjustment (leveling operation) is carried out to correct the deviation of the optical axis that varies depending on the weight of loads that a vehicle carries. On the other hand, the lamp unit is pivoted within a horizontal plane by the actuator, whereby so-called swiveling adjustment (swiveling operation) is carried out to change the direction of the optical axis in in response to a change in the travelling direction of the vehicle.

The above-described vehicular headlamps configured to adjust the direction of radiation of the light emitted from the light source include the following two kinds of vehicular headlamps: i) vehicular headlamps that have the function of carrying out the swiveling operation but does not have the function of carrying out the leveling operation; and ii) vehicular headlamps that have the function of carrying out the leveling operation but does not have the function of carrying out the swiveling operation.

An actuator of a vehicular headlamp having the function of carrying out only the swiveling operation includes components for the swiveling operation, but does not include components for the leveling operation. On the other hand, an actuator of a vehicular headlamp having the function of carrying out only the leveling operation includes components for the leveling operation, but does not include components for the swiveling operation.

For example, an actuator of a vehicular headlamp having the function of carrying out only the leveling operation includes a drive motor, which serves as a drive source, and various members that are operated by the driving force generated by the drive motor to cause a lamp unit to pivot in the vertical direction. Therefore, there have been demands for simplification of the configurations of these members.

SUMMARY OF THE INVENTION

The invention provides an actuator including a smaller number of components, thus having a simplified configuration.

An aspect of the invention relates to an actuator configured to adjust the direction of radiation of light emitted from a light source of a lamp unit disposed in a lamp case including a lamp housing having an opening at least at one side and a cover that blocks the opening of the lamp housing. The actuator includes: a case body having an internal space serving as an installation space; a drive motor disposed in the installation space; and a driven body having a driving force transmitting portion to which driving force generated by the drive motor is transmitted, and an output shaft that is coupled to the lamp unit and that outputs the driving force transmitted to the driving force transmitting portion to the lamp unit. The driven body is supported by the case body so as to be movable in the front-rear direction of the lamp unit. The driving force transmitting portion and the output shaft are integral with each other.

According to the above aspect, the driving force transmitting portion and the output shaft are each formed as part of the driven body.

In the actuator according to the above aspect, the case body may have a guide portion that guides the driven body in the front-rear direction, the guide portion being integral with the case body.

Thus, the driven body is moved in the front-rear direction under the guidance of the guide portion formed to be integral with the case body.

In the actuator according to the aspect may further include: a circuit board including a substrate that faces the vertical direction of the lamp unit, and an electronic component installed on the substrate; and a worm disposed in the installation space. The driving force transmitting portion may be a gear. The worm may be rotated by the driving force generated by the drive motor, and may be meshed with the gear. The electronic component may be disposed lateral to the drive motor and the worm in the lateral direction of the lamp unit.

Thus, the region in which the electronic component is installed and the region in which the drive motor and worm are installed are individually formed to be located next to each other in the lateral direction.

The actuator configured as described above may further include: a transmission gear meshed with the worm to transmit the driving force generated by the drive motor to the worm; and a connector that is disposed on the substrate, and to which electricity is externally supplied. The transmission gear, the drive motor and the connector may be aligned in the lateral direction.

Thus, the transmission gear, the drive motor and the connector are not aligned in the front-rear direction.

In the actuator according to the above aspect, the output shaft may be rotated when the driven body moves in the front-rear direction; and a peripheral face of the output shaft may have a spherical shape.

Thus, the output shaft does not have any portion projecting in the lateral direction.

According to the above aspect, the driving force transmitting portion and the output shaft are each formed as part of the driven body. This configuration contributes to reduction in the number of components of the actuator, leading to simplification of the configuration of the actuator.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
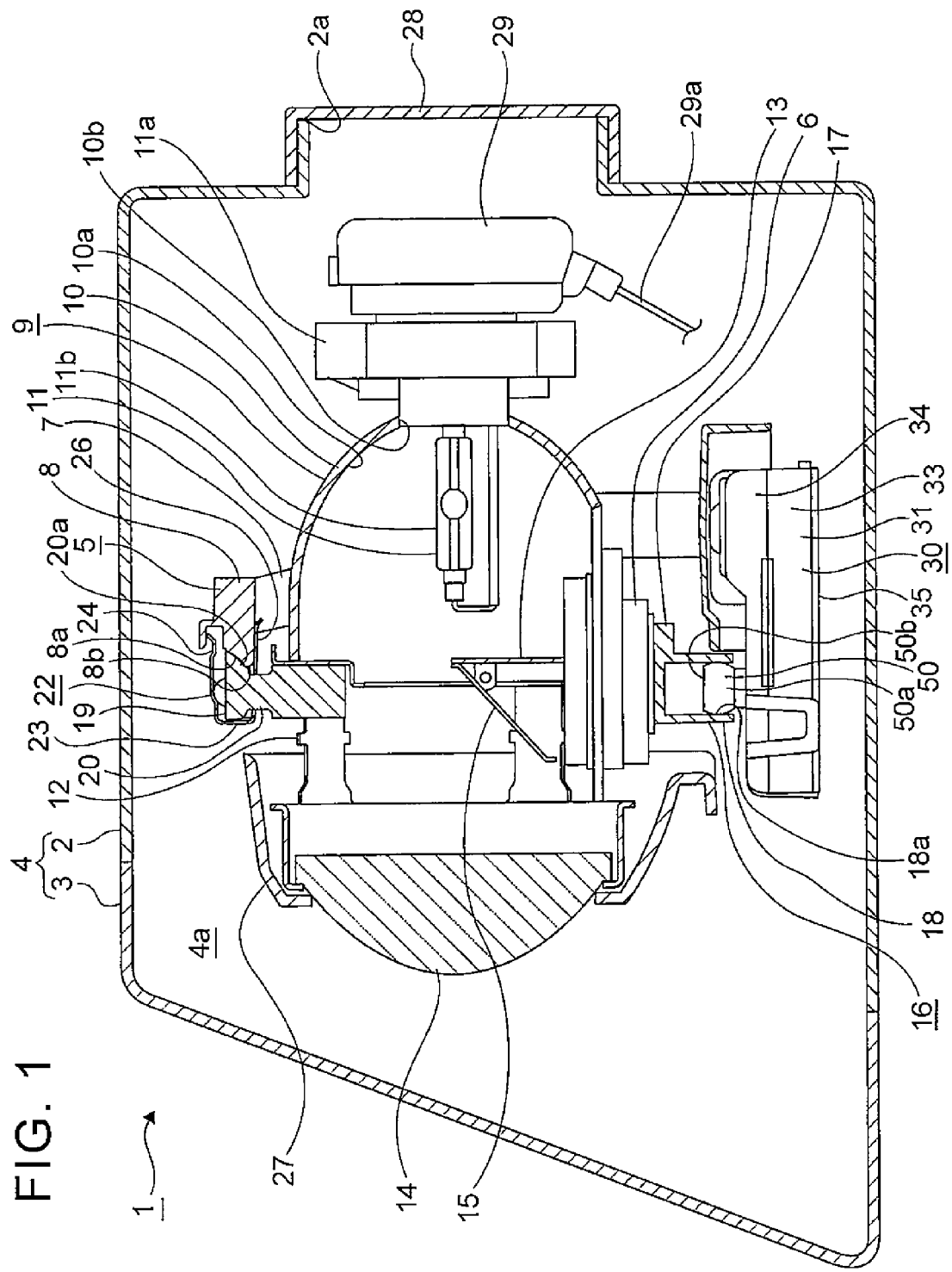
FIG. 1 is a vertical sectional view of a vehicular headlamp, illustrating an embodiment of the invention in cooperation with FIG. 2 to FIG. 9.

Hereinafter, an actuator according to an embodiment of the invention will be described with reference to the accompanying drawings.

First, a vehicular headlamp 1 provided with an actuator will be described with reference to FIG. 1 and FIG. 2.

The vehicular headlamps 1 are fitted respectively to the right and left end portions of the front end of a vehicle body.

Each vehicular headlamp 1 includes a lamp housing 2 having an opening at its front end, and a cover 3 that blocks the opening of the lamp housing 2. The lamp housing 2 and the cover 3 constitute a lamp case 4. The internal space of the lamp case 4 is used as a lamp chamber 4a.

A fitting opening 2a is formed at the rear end portion of the lamp housing 2. The fitting opening 2a extends through the rear end portion in the front-rear direction.

A bracket 5 is disposed in the lamp chamber 4a. The bracket 5 is supported by an aiming mechanism (not illustrated) so as to be tiltable (pivotable) relative to the lamp housing 2 in the lateral direction and in the vertical direction. The bracket 5 has a fitting portion 6, pillars 7, and a suspending portion 8. The fitting portion 6 extends in the lateral direction. The pillars 7 project upward respectively from the right and left end portions of the fitting portion 6. The suspending portion 8 extends in the lateral direction to connect the upper end portions of the pillars 7 to each other. A receiving-and-supporting portion 8a is formed at the center of the suspending portion 8 in the lateral direction. The receiving-and-supporting portion 8a has a circular-arc shape, and its top face has a generally spherical shape. The suspending portion 8 has an insertion recess 8b that is located inside the receiving-and-supporting portion 8a, that opens forward, and that extends through the suspending portion 8 in the vertical direction.

The fitting portion 6 has coupling projections 6a that project downward and that are apart from each other in the lateral direction.

A lamp unit 9 is disposed in the lamp chamber 4a. The lamp unit 9 is supported by the bracket 5 so as to be pivotable (tiltable) in the vertical direction.

The lamp unit 9 includes a reflector 10, a light source 11, a lens holder 12, and a projection lens 14. The reflector 10 reflects light. The light source 11 is fitted to the rear end portion of the reflector 10. The lens holder 12 is disposed in front of the reflector 10. The projection lens 14 is fitted to the front end portion of the lens holder 12 to be held by the lens holder 12.

The reflector 10 has a bowl-shape that opens forward. The inner face of the reflector 10 is formed as a reflective surface 10a. A fitting hole 10b is formed in the rear end portion of the reflector 10.

For example, a discharge lamp may be used as the light source 11. The light source 11 includes a base 11a and a light emitter 11b. The base 11a is fitted in the fitting hole 10b of the reflector 10. The light emitted from the light emitter 11b is reflected by the reflective surface 10a of the reflector 10, and is then radiated forward through the projection lens 14 and the cover 3.

A stationary shade 13 is disposed between the reflector 10 and the projection lens 14. The stationary shade 13 has the function of blocking part of the light emitted from the light source 11.

A movable shade 15 is pivotably disposed in front of the stationary shade 13. The movable shade 15 has the function of blocking part of the light emitted from the light source 11. The movable shade 15 further has the function of changing the amount of light to be blocked depending on the position to which the movable shade 15 is pivoted, thereby allowing, for example, switchover between the high beam and the low beam.

A joint 16 is fitted to the lower end portion of the lamp unit 9. The joint 16 has an attached plate 17 and a coupling projection 18. The attached plate 17 faces the vertical direction (i.e., the upper face of the attached plate 17 faces upward, and the lower face thereof faces downward). The coupling projection 18 projects downward from the attached plate 17. The coupling projection 18 has a coupling recess 18a that opens downward.

The attached plate 17 of the joint 16 is attached to the lower end portion of the lamp unit 9 with, for example, screws.

A supported projection 19 is disposed at the upper end portion of the lamp unit 9. The supported projection 19 has a supported shaft portion 20 and rotation restricting ribs 21. The supported shaft portion 20 projects upward from the upper end portion of the lamp unit 9. The rotation restricting ribs 21 project upward from the upper face of the supported shaft portion 20.

The upper end portion of the supported shaft portion 20 is formed as a generally hemispherical sliding portion 20a having a downwardly convex shape. The rotation restricting ribs 21 are plate members that face each other and apart from each other in the lateral direction.

The lower portion of the sliding portion 20a of the supported shaft portion 20 is inserted into the insertion recess 8b formed in the suspending portion 8 of the bracket 5. Thus, the sliding portion 20a is slidably supported from below by the receiving-and-supporting portion 8a.

The lamp unit 9 is suspended from the suspending portion 8 via a retaining spring 22. The retaining spring 22 has an attached sheet portion 23, a holding piece 24, upper sheet portions 25, and lower sheet portions 26. The attached sheet portion 23 has an elongate shape extending in the lateral direction. The attached sheet portion 23 faces the front-rear direction (i.e., the front face of the attached sheet portion 23 faces forward, and the rear face thereof faces rearward). The holding piece 24 projects rearward from the upper edge of the attached sheet portion 23. The upper sheet portions 25 project rearward from the upper edge of the attached sheet portion 23. The lower sheet portions 26 project rearward from the lower edge of the attached sheet portion 23.

The holding piece 24 projects rearward from the center of the upper edge of the attached sheet portion 23 in the lateral direction. The upper sheet portions 25 are located respectively on the right side and the left side of the holding piece 24. The lower sheet portions 26 are located immediately below the corresponding upper sheet portions 25.

Spaces are formed between the holding piece 24 and the upper sheet portions 25. The spaces are used as restricting slits 22a.

When the sliding portion 20a of the supported shaft portion 20 is supported by the receiving-and-supporting portion 8a, the attached sheet portion 23 of the retaining spring 22 is pressed against the front face of the suspending portion 8 and the upper sheet portions 25 and the lower sheet portions 26 hold, from above and below, the center portion of the suspending portion 8 in the lateral direction. In this way, the retaining spring 22 is fitted to the suspending portion 8.

When the retaining spring 22 is fitted to the suspending portion 8, the sliding portion 20a is held from above by the holding piece 24 and thus the sliding portion 20a is pressed against the receiving-and-supporting portion 8a from above and the sliding portion 20a is slidable relative to the receiving-and-supporting portion 8a. As a result, the lamp unit 9 is allowed to pivot about the supported shaft portion 20 in the vertical direction relative to the bracket 5. At this time, the rotation restricting ribs 21 of the supported projection 19 are inserted in the restricting slits 22a of the retaining spring 22. As a result, a pivot motion of the lamp unit 9 in the lateral direction about the supported shaft portion 20 is restricted.

A unit cover 27 is fitted to the front end portion of the lamp unit 9. The unit cover 27 shields, from the front side, the outer portion of the projection lens 14 of lamp unit 9.

A back cover 28 that blocks the fitting opening 2a is fitted to the rear end portion of the lamp housing 2.

A discharge lamp activating device 29 is fitted to the rear end portion of the base 11a of the light source 11. The discharge lamp activating device 29 is used to activate the light source 11. A lighting circuit is disposed inside the discharge lamp activating device 29.

The discharge lamp activating device 29 is connected to a power circuit (not illustrated) with a cable 29a.

Next, an actuator 30 that causes the lamp unit 9 to pivot in the vertical direction, thereby carrying out a leveling operation will be described with reference to FIG. 1 to FIG. 5.

Figure 3:
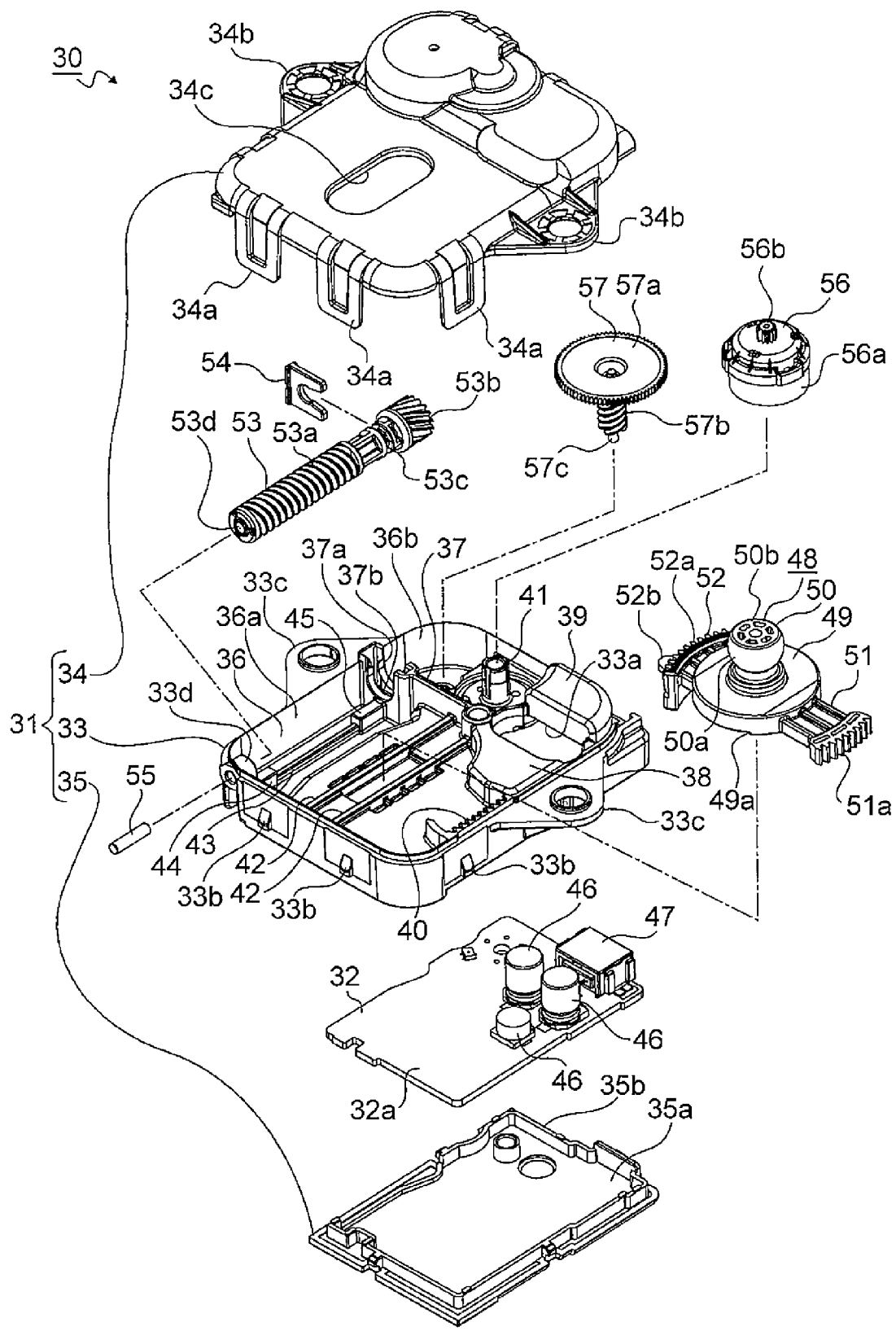
FIG. 3 is an exploded perspective view of an actuator of the vehicular headlamp.
Figure 4:
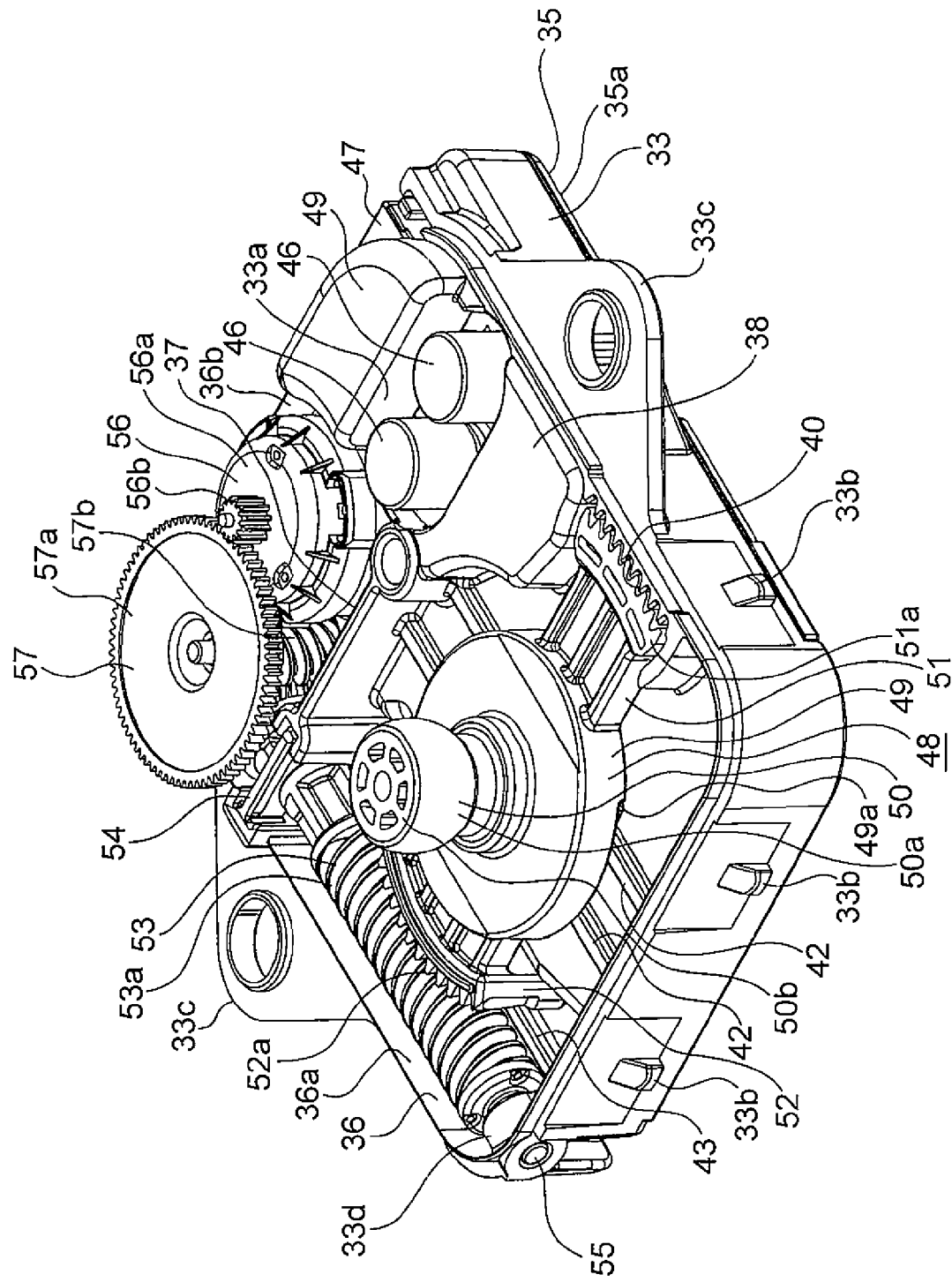
FIG. 4 is a perspective view of the actuator with a cover case removed.

The actuator 30 is disposed below the lamp unit 9 as illustrated in FIG. 1. As illustrated in FIG. 3 and FIG. 4, the actuator 30 includes a case body 31, a circuit board 32 fitted to the case body 31, and various members (described later in detail) installed in the case body 31.

The case body 31 is formed of an installation case 33, a cover case 34 and a base case 35. The installation case 33 has a box shape and opens upward. The cover case 34 closes the installation case 33 from above. The base case 35 is fitted to the installation case 33 from below.

The internal space of the installation case 33 is defined as an installation space 36. A partition wall 37, which partitions the installation space 36 into a front space and a rear space, is integral with the installation case 33. An insertion recess 37a, which opens upward, is formed in the right end portion of the partition wall 37. A fitting groove 37b, which opens upward, is formed in the right end portion of the partition wall 37, in which the insertion recess 37a is formed.

The installation space 36 is partitioned into the front space and the rear space by the partition wall 37. The front space located in front of the partition wall 37 is defined as an operating member installation portion 36a, whereas the rear space located behind the partition wall 37 is defined as a driving member installation portion 36b.

Projected installation portions 38, 39 are disposed at the rear right end portion of the installation case 33. The projected installation portions 38, 39 are apart from each other in the front-rear direction. The projected installation portions 38, 39 each have a box shape that opens at least downward. The installation case 33 has an installation opening 33a that is located between the projected installation portions 38, 39 and that extends through the installation case 33 in the vertical direction.

The outer peripheral face of the installation case 33 has a plurality of engagement projections 33b that are apart from each other in the direction along the outer periphery of the installation case 33. The upper end portion of the installation case 33 is provided with fitted projections 33c. One of the fitted projections 33c projects rightward, and the other one of the fitted projections 33c projects leftward. A shaft support portion 33d is disposed at the front right end portion of the installation case 33. The shaft support portion 33d is perforated in the front-rear direction.

The inner face of the left side portion of the installation case 33 is provided with a rack 40 that extends in the front-rear direction. The rack 40 is located in the operating member installation portion 36a. In the installation case 33, a motor fitting projection 41 is disposed at the center of the driving member installation portion 36b in the lateral direction. The motor fitting projection 41 projects upward.

Guide portions 42 extending in the front-rear direction are formed to be integral with the upper face of the bottom portion of the installation case 33. The guide portions 42 are apart from each other in the lateral direction.

A sliding projection 43 extending in the front-rear direction is formed to be integral with the upper face of the bottom portion of the installation case 33. The sliding projection 43 is located at the right end portion of the bottom portion. Stoppers 44, 45 are disposed in the installation case 33. The stoppers 44, 45 are connected directly to the front and rear end portions of the sliding projection 43, respectively. The stoppers 44, 45 are greater in height than the sliding projection 43.

A shallow installation recess (not illustrated) that opens downward is formed in the lower face of the bottom portion of the installation case 33.

The cover case 34 has a shallow box shape that opens downward. The outer peripheral face of the cover case 34 has a plurality of engagement pieces 34a that project downward. Each engagement piece 34a has an engagement hole.

The cover case 34 has fitted projections 34b. One of the fitted projections projects rightward, whereas the other one of the fitted projections projects leftward. An insertion hole 34c, which extends through the cover case 34 in the vertical direction, is formed at a position near the front end of the cover case 34. The insertion hole 34c has an elongate shape extending in the front-rear direction.

The base case 35 has a closing plate portion 35a and a fitting projection 35b. The closing plate portion 35a is in the form of a plate. The closing plate portion 35a faces the vertical direction (i.e., the upper face of the closing plate portion 35a faces upward, and the lower face thereof faces downward). The fitting projection 35b projects upward from a portion of the closing plate portion 35a, which is near the outer periphery of the closing plate portion 35a.

The circuit board 32 is disposed on and attached to a portion of the closing plate portion 35a of the base case 35, the portion being located inside the fitting projection 35b. The circuit board 32 is installed in the installation recess formed in the lower face of the bottom portion of the installation case 33. The circuit board 32 has a prescribed circuit pattern (not illustrated). The circuit board 32 has a substrate 32a. The circuit board 32 faces the vertical direction (i.e., the upper face of the substrate 32a faces upward, and the lower face thereof faces downward). Electronic components 46 and a connector 47 are installed on the substrate 32a. Some of the electronic components 46 are disposed in the front projected installation portion 38, the other electronic components 46 are disposed in the installation opening 33a, and the connector 47 is disposed in the rear projected installation portion 39.

As described above, the installation case 33 has the installation opening 33a in which some of the electronic components 46 are installed. This configuration makes it possible to avoid contact between the installation case 33 and the electronic components 46, thereby making the actuator 30 thinner.

A driven body 48 is disposed in the operating member installation portion 36a of the installation space 36 of the installation case 33. The driven body 48 is supported by the installation case 33 so as to be movable in the front-rear direction. The driven body 48 is a single-piece member that has a base disc 49 in a generally disc shape, an output shaft 50, a first projection 51, and a second projection 52. The output shaft 50 projects upward from the center of the base disc 49. The first projection 51 projects leftward from the base disc 49. The second projection 52 projects rightward from the base disc 49.

Figure 5:
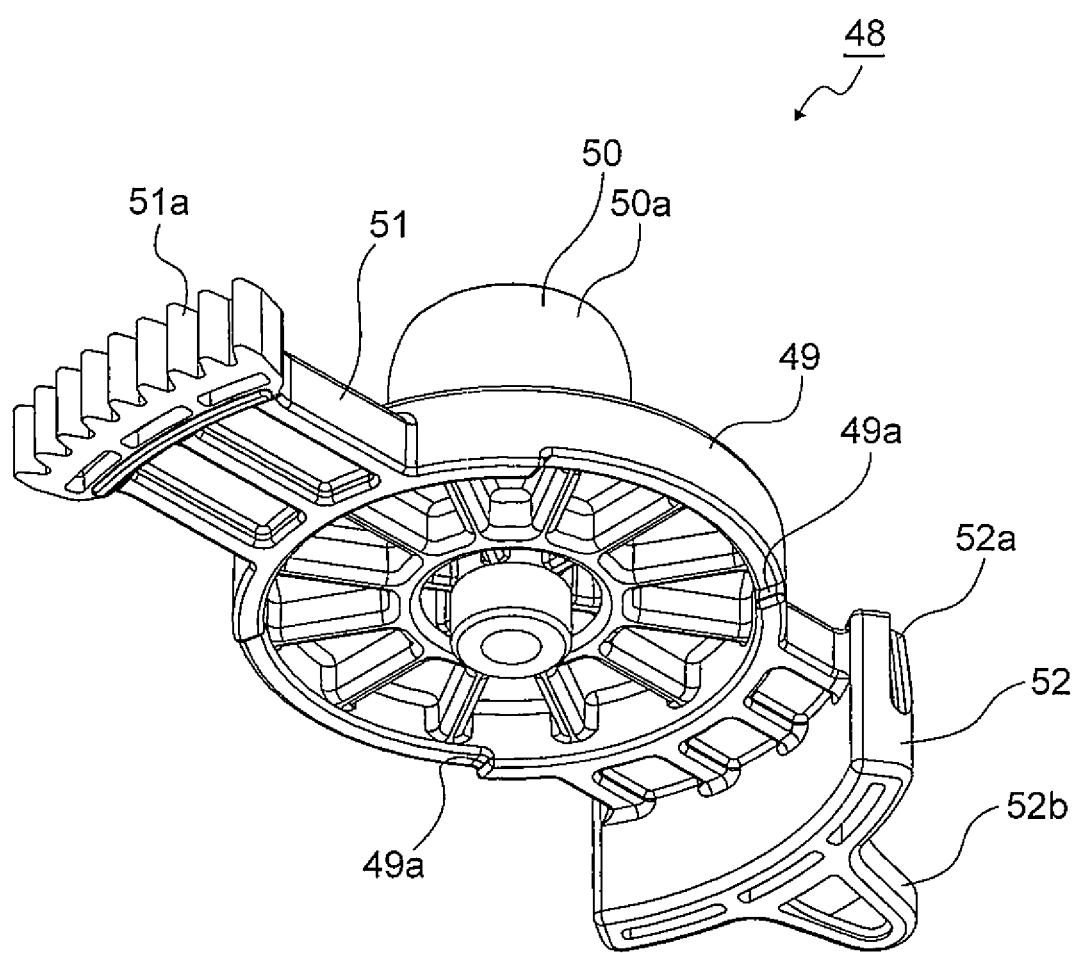
FIG. 5 is an enlarged perspective view of a driven body.

The outer peripheral portion of the base disc 49 has guided recesses 49a that are apart from each other in the front-rear direction, as illustrated in FIG. 5.

The output shaft 50 has a peripheral face 50a having a generally spherical shape, and a top face 50b that faces upward, as illustrated in FIG. 3 to FIG. 5.

The left side portion of the first projection 51 has a driven gear 51a that extends in the circumferential direction of the driven body 48.

The right side portion of the second projection 52 has a gear 52a that extends in the circumferential direction of the driven body 48. The gear 52a may function as a driving force transmitting portion. The second projection 52 has a stopped portion 52b that projects rightward.

The driven gear 51a and the gear 52a are located concentrically around the center of the base disc 49.

The guide portions 42 of the installation case 33 are inserted in the guided recesses 49a of the driven body 48. Thus, the driven body 48 is supported by the installation case 33 so as to be movable in the front-rear direction under the guidance of the guide portions 42. When the driven body 48 is supported by the installation case 33, the driven gear 51a is meshed with the rack 40 of the installation case 33 and the stopped portion 52b is allowed to slide on the sliding projection 43.

A worm 53 extending in the front-rear direction is rotatably supported at the right end portion of the installation space 36 of the installation case 33. The worm 53 has a driving gear 53a and an actuating gear 53b that are apart from each other in the front-rear direction. An insertion groove 53c extending in the circumferential direction of the worm 53 is located between the driving gear 53a and the actuating gear 53b. A shaft fitting hole 53d, which opens forward, is formed in the front end portion of worm 53.

The worm 53 is rotatably supported by the installation case 33 via a washer 54 and a supported shaft 55. The washer 54 has a generally U-shape. The washer 54 is inserted, from above, into the fitting groove 37b of the partition wall 37 of the installation case 33, and thus fitted to the partition wall 37. The supported shaft 55 is press-fitted into the shaft support portion 33d of the installation case 33. Thus, the worm 53 is rotatable relative to the supported shaft 55.

The washer 54 is inserted into the insertion groove 53c, and thus fitted onto the worm 53. The supported shaft 55 is fitted into the shaft fitting hole 53d. With this configuration, the worm 53 is rotatably supported by the installation case 33. When the worm 53 is supported by the installation case 33, the driving gear 53a is meshed with the gear 52a of the driven body 48.

In order to prevent the worm 53 from moving upward away from the installation case 33, the actuator 30 may have the following configuration. That is, instead of the washer 54, for example, a pressing portion that presses the worm 53 from above may be disposed on the lower surface of the cover case 34. However, when the cover case 34 is provided with the pressing portion, in order to avoid contact between the pressing portion and the components installed in the installation space 36, such as a transmission gear 57, it is necessary to change the position of the transmission gear 57. A change in the position of the transmission gear 57 may result in an increase in the size of the actuator 30.

If the above-described configuration in which the washer 54 is used to allow the worm 53 to be rotatably supported by the installation case 33 is employed, it is no longer necessary to provide the cover case 34 with the pressing portion. This contributes to reduction in the size of the actuator 30.

A drive motor 56 is fitted to the motor fitting projection 41 of the installation case 33.

The drive motor 56 includes a main body 56a and a drive gear 56b fixed to a motor shaft that projects upward from the main body 56a.

The transmission gear 57 is rotatably supported at the right end portion of the driving member installation portion 36b of the installation case 33. The transmission gear 57 has a spur gear 57a and a worm 57b disposed below the spur gear 57a. The transmission gear 57 is rotatably supported by the installation case 33 via a support shaft 57c fitted to the worm 57b. The spur gear 57a of the transmission gear 57 is meshed with the drive gear 56b of the drive motor 56, and the worm 57b of the transmission gear 57 is meshed with the actuating gear 53b of the worm 53.

With this configuration, as the drive motor 56 rotates, the driving force generated by the drive motor 56 is transmitted to the drive gear 56b, the transmission gear 57, and the worm 53 in this order. The thus transmitted driving force rotates the worm 53, and the rotation of the worm 53 moves the gear 52a of the driven body 48 in a direction corresponding to the direction of rotation of the drive motor 56. With the movement of the gear 52a, the position at which the driven gear 51a of the driven body 48 is meshed with the rack 40 is changed, and the driven body 48 is moved, while rotating, in the front-rear direction under the guidance of the guide portions 42. At this time, the stopped portion 52b of the driven body 48 slides on the sliding projection 43.

Figure 2:
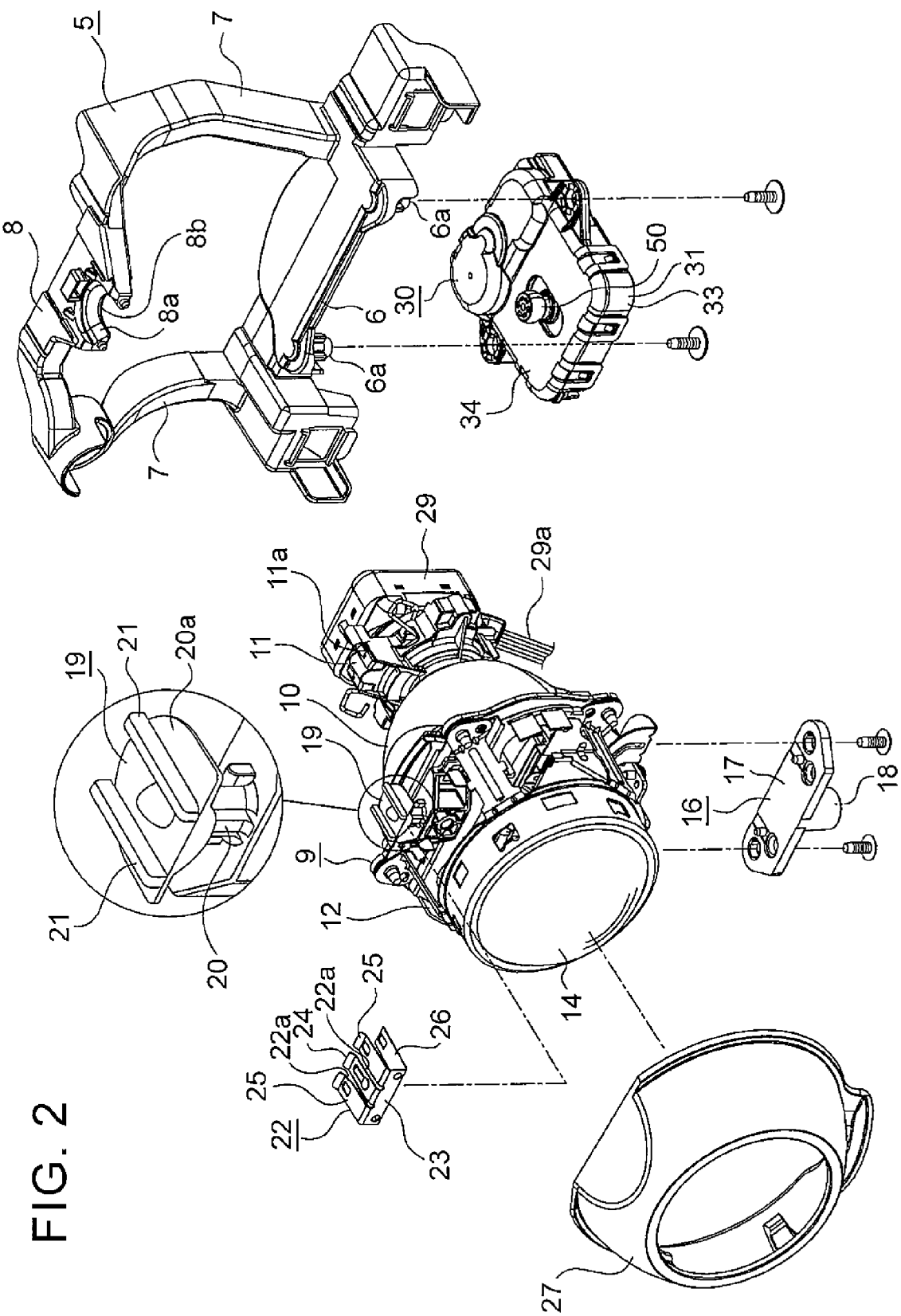
FIG. 2 is an exploded perspective view illustrating the internal configuration of the vehicular headlamp.

When the cover case 34 is coupled to the installation case 33, the output shaft 50 of the driven body 48 projects upward from the insertion hole 34c of the cover case 34, as illustrated in FIG. 1 and FIG. 2.

The actuator 30 configured as described above is fitted to the bracket 5 by coupling the coupling projections 6a of the fitting portion 6 of the bracket 5 to the fitted projections 34b of the cover case 34 and then fastening the coupling projections 6a and the fitted projections 34b together, for example, with screws.

When the actuator 30 is fitted to the bracket 5, the output shaft 50 is inserted into the coupling recess 18a of the joint 16 the lamp unit 9 and thus coupled to the lamp unit 9.

When the output shaft 50 is coupled to the lamp unit 9, the lamp unit 9 pivots about the supported shaft portion 20 in the vertical direction relative to the output shaft 50 in accordance with the movement of the output shaft 50 in the front-rear direction.

The leveling operation carried out in the vehicular headlamp 1 will be described below with reference to FIG. 6 to FIG. 9. FIG. 6 to FIG. 9 illustrate the operation of the actuator 30 as viewed from above. Note that, the lamp unit 9 and the cover case 34 are not illustrated in FIG. 6 to FIG. 9.

The leveling operation is an operation for causing the lamp unit 9 to pivot in the vertical direction within a vertical plane in order to correct the deviation of the optical axis that varies depending on the weight of loads that the vehicle carries. In the leveling operation, the lamp unit 9 pivots in the vertical direction about the supported shaft portion 20.

Figure 6:
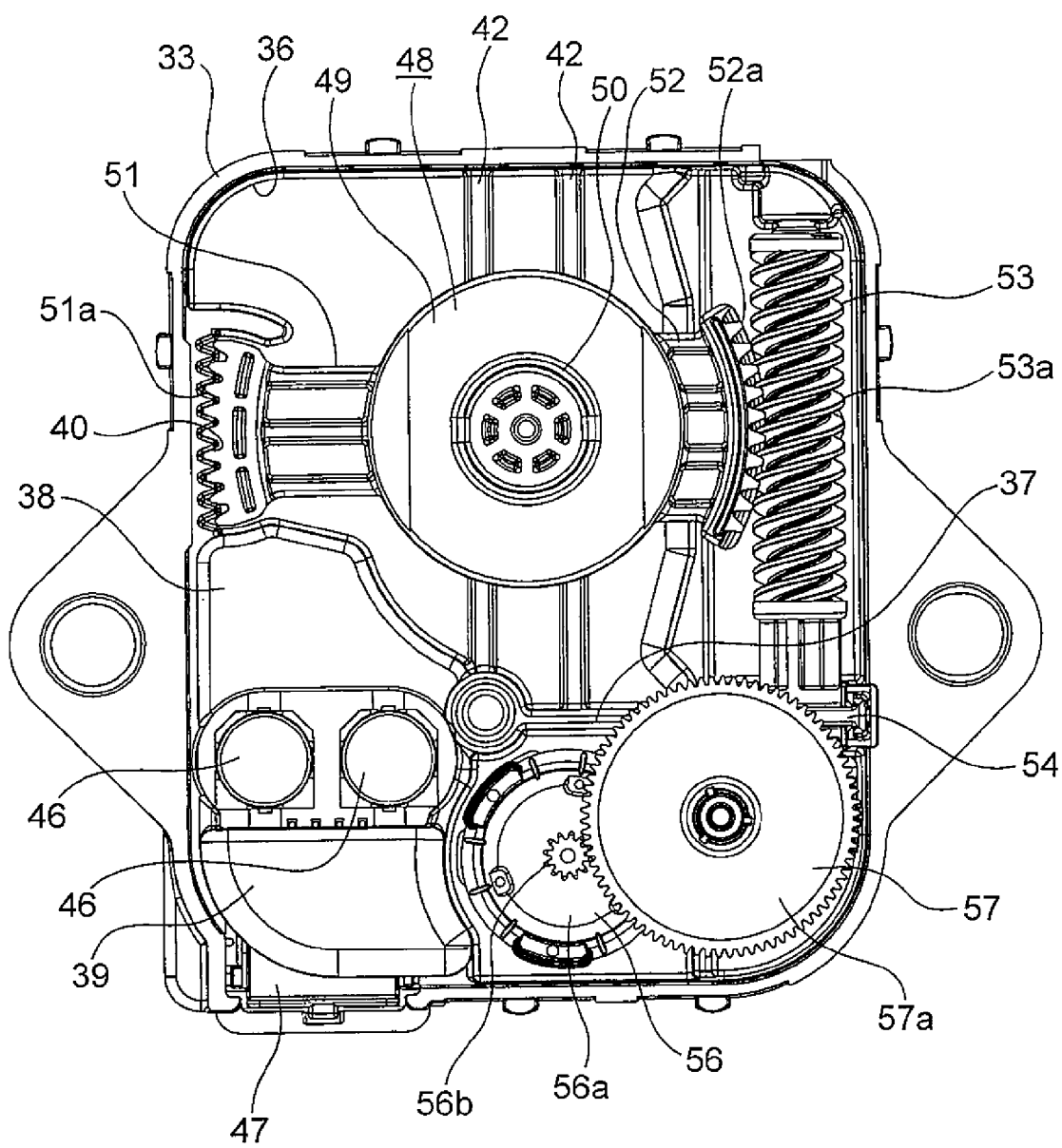
FIG. 6 illustrates a leveling operation in cooperation with FIG. 7, FIG. 6 being a schematic plan view illustrating the state of the actuator before the leveling operation.

In the state before the leveling operation is carried out, the driven body 48 is located, for example, at the center of its moving range in the front-rear direction, as illustrated in FIG. 6.

Figure 7:
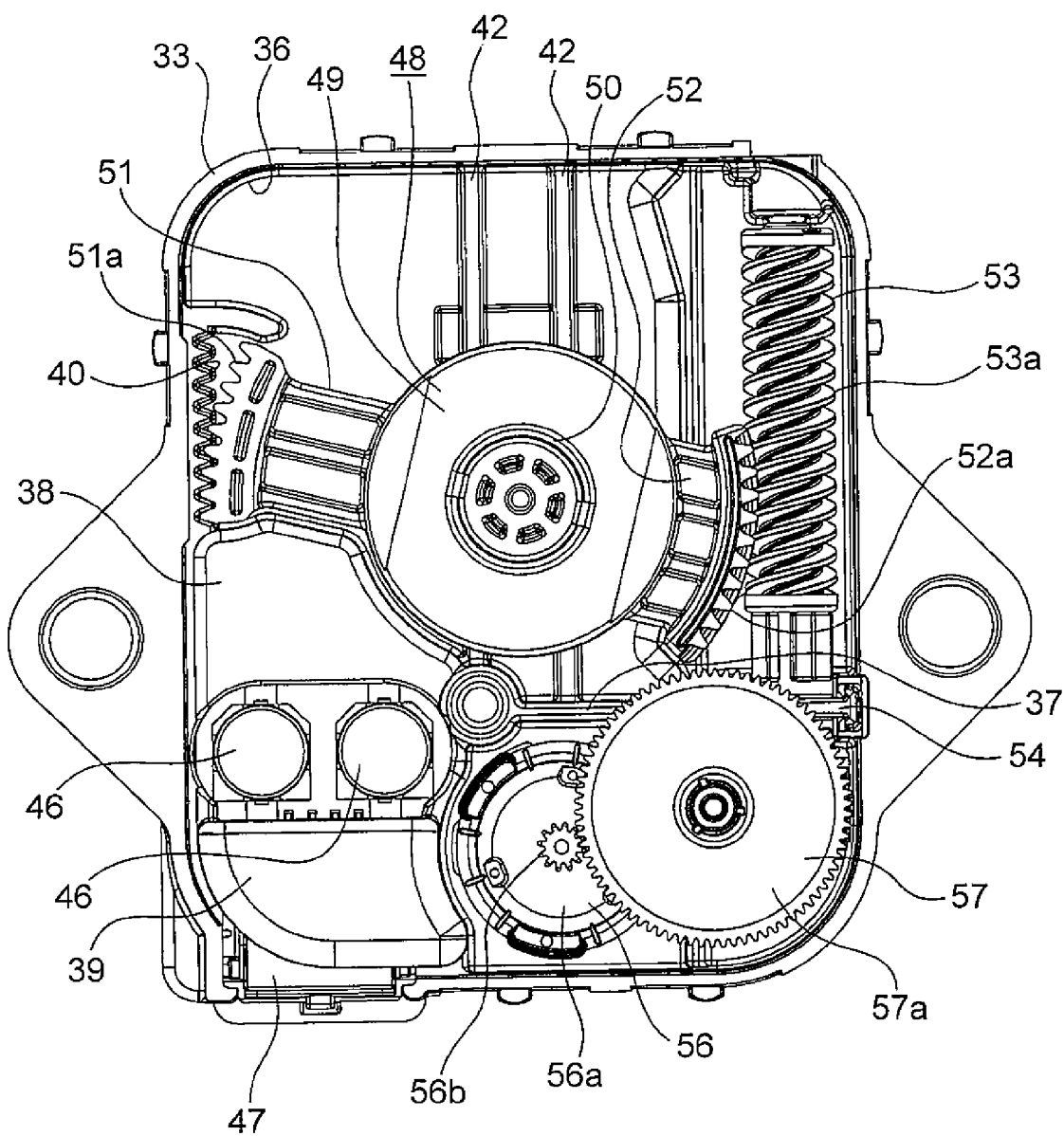
FIG. 7 is a schematic plan view illustrating the state of the actuator after the leveling operation.

As the drive motor 56 is rotated by the electricity supplied from the power circuit (not illustrated) via the connector 47, the driving force generated by the drive motor 56 is transmitted to the worm 53. As the driving force generated by the drive motor 56 is transmitted to the worm 53, the gear 52a is moved in a direction corresponding to the direction of rotation of the worm 53. As the gear 52a is moved, the position at which the driven gear 51a of the driven body 48 is meshed with the rack 40 is changed, and thus the driven body 48 is moved in the front-rear direction while rotating, as illustrated in FIG. 7.

As the driven body 48 is moved in the front-rear direction, the lamp unit 9 pivots in the vertical direction in accordance with the movement of the driven body 48, that is, the leveling operation is carried out.

Figure 8:
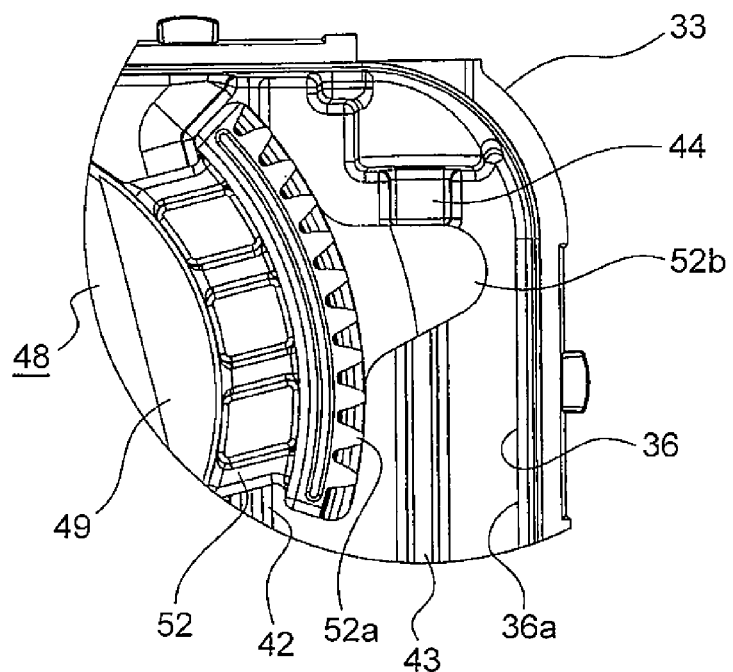
FIG. 8 is an enlarged plan view illustrating the state where a stopped portion of the driven body is brought into contact with a front stopper disposed in an installation case, so that movement of the driven body is restricted.
Figure 9:
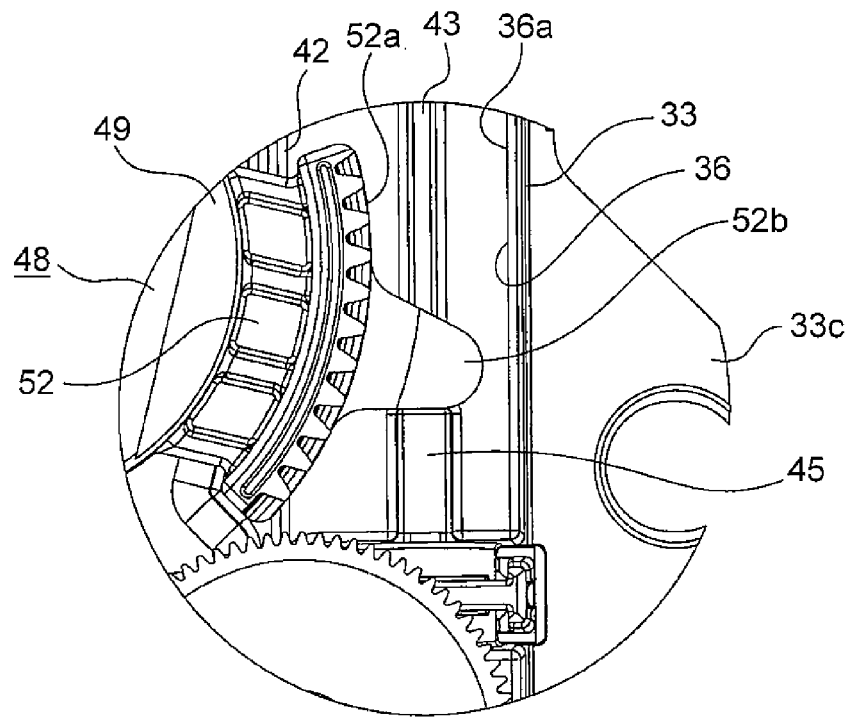
FIG. 9 is an enlarged plan view illustrating the state where the stopped portion of the driven body is brought into contact with a rear stopper disposed in the installation case, so that movement of the driven body is restricted.

During the leveling operation, the stopped portion 52b of the driven body 48 slides on the sliding projection 43. In this case, if the driven body 48 is largely moved forward, the stopped portion 52b is brought into contact with the front stopper 44 to restrict excessive movement of the driven body 48, as illustrated in FIG. 8. On the other hand, if the driven body 48 is largely moved rearward, the stopped portion 52b is brought into contact with the rear stopper 45 to restrict excessive movement of the driven body 48, as illustrated in FIG. 9. Thus, it is possible to prevent excessive pivot motion of the lamp unit 9 during the leveling operation. The stoppers 44, 45 may be used as positioning portions that define the initial front and rear positions of the driven body 48.

As described above, in the actuator 30, the gear 52a, which functions as the driving force transmitting portion to which the driving force generated by the drive motor 56 is transmitted, and the output shaft 50 coupled to the lamp unit 9 are formed to be integral with each other. Thus, the gear 52a and the output shaft 50 are each formed as a part of the driven body 48. This makes it possible to reduce the number of components of the actuator 30, leading to simplification of the configuration of the actuator 30.

In addition, the guide portions 42, which guide the driven body 48 in the front-rear direction, are formed to be integral with the case body 31. Thus, the driven body 48 is moved in the front-rear direction under the guidance of the guide portions 42 integral with the case body 31. This makes it possible to further reduce the number of components of the actuator 30, thereby promoting simplification of the configuration of the actuator 30.

The actuator 30 further includes the circuit board 32 including the substrate 32a, and the electronic components 46 installed on the substrate 32a. The substrate 32a faces the vertical direction (i.e., the upper face of the substrate 32a faces upward, and the lower face thereof faces downward). The electronic components 46 are located lateral to (at the side of) the drive motor 56 and the worm 53 in the lateral direction.

Thus, the region in which the electronic components 46 are installed and the region in which the drive motor 56 and worm 53 are installed are individually formed to be located next to each other in the lateral direction. This makes the actuator 30 thinner.

Further, the transmission gear 57, the drive motor 56 and the connector 47 are aligned in the lateral direction. Thus, the transmission gear 57, the drive motor 56 and the connector 47 are not aligned in the front-rear direction. This configuration contributes to reduction in the size of the actuator 30 in the front-rear direction.

In addition, the peripheral face 50a of the output shaft 50, which is rotated as the driven body 48 moves in the front-rear direction, has a spherical shape. Thus, the output shaft 50 does not have any portion that projects in the lateral direction. This configuration contributes to reduction in the size of the driven body 48. Further, it is possible to prevent the lamp unit 9 from pivoting within a horizontal plane in accordance with the rotation of the output shaft 50. As a result, it is possible to prevent the direction of radiation of the light emitted from the light source 11, from deviating in the lateral direction.

What is claimed is:

1. An actuator configured to adjust a direction of radiation of light emitted from a light source of a lamp unit disposed in a lamp case including a lamp housing having an opening at least at one side and a cover that blocks the opening of the lamp housing, comprising:

a case body having an internal space serving as an installation space;

a drive motor disposed in the installation space; and a driven body having a driving force transmitting portion to which driving force generated by the drive motor is transmitted, and an output shaft that is coupled to the lamp unit and that outputs the driving force transmitted to the driving force transmitting portion to the lamp unit, the driven body being supported by the case body so as to be movable in a front-rear direction of the lamp unit, the driving force transmitting portion and the output shaft being integral with each other, wherein the case body has a guide portion that guides the driven body in the front-rear direction, the guide portion being integral with the case body.

2. The actuator according to claim 1, further comprising:
a circuit board including a substrate that faces a vertical direction of the lamp unit, and an electronic component installed on the substrate; and
a worm disposed in the installation space, wherein
the driving force transmitting portion is a gear,
the worm is rotated by the driving force generated by the drive motor, and is meshed with the gear, and
the electronic component is disposed lateral to the drive motor and the worm in a lateral direction of the lamp unit.

3. The actuator according to claim 2, further comprising:
a transmission gear meshed with the worm to transmit the driving force generated by the drive motor to the worm; and
a connector that is disposed on the substrate, and to which electricity is externally supplied, wherein
the transmission gear, the drive motor and the connector are aligned in the lateral direction.

4. The actuator according to claim 1, wherein:
the output shaft is rotated when the driven body moves in the front-rear direction; and
a peripheral face of the output shaft has a spherical shape.

\* \* \* \* \*